(12) United States Patent
Park et al.

(10) Patent No.: US 12,454,407 B2
(45) Date of Patent: Oct. 28, 2025

(54) METHOD AND SYSTEM FOR MANAGING METAL SHIELD SPACE USING PLURALITY OF TERMINALS

(71) Applicant: ZN TECHNOLOGIES CO., LTD., Ulsan (KR)

(72) Inventors: Chul Gyun Park, Seoul (KR); Chang Soo Kang, Gyeonggi-do (KR); Dong Tak Kim, Incheon (KR)

(73) Assignee: ZN Technologies Co., Ltd., Ulsan (KR)

( * ) Notice: Subject to any disclaimer, the term of this patent is extended or adjusted under 35 U.S.C. 154(b) by 0 days.

(21) Appl. No.: 18/687,946

(22) PCT Filed: Sep. 2, 2022

(86) PCT No.: PCT/KR2022/013155
§ 371 (c)(1),
(2) Date: Feb. 29, 2024

(87) PCT Pub. No.: WO2023/033576
PCT Pub. Date: Mar. 9, 2023

(65) Prior Publication Data
US 2024/0375856 A1    Nov. 14, 2024

(30) Foreign Application Priority Data
Sep. 3, 2021 (KR) .................. 10-2021-0117520

(51) Int. Cl.
*B65D 90/48* (2006.01)
*B65D 90/00* (2006.01)
(52) U.S. Cl.
CPC .......... *B65D 90/48* (2013.01); *B65D 90/008* (2013.01); *B65D 2203/10* (2013.01); *B65D 2211/00* (2013.01)

(58) Field of Classification Search
CPC .. B65D 90/48; B65D 90/008; B65D 2203/10; B65D 2211/00; G06Q 10/06; G06Q 50/10; G06Q 10/08
See application file for complete search history.

(56) References Cited

U.S. PATENT DOCUMENTS 7,967,199 B2 *  6/2011  Linton .................. G06Q 10/08
                                                    235/382
9,760,853 B2 *  9/2017  Rose ........................ G01S 5/02
(Continued)

FOREIGN PATENT DOCUMENTS

CN        101209771 A    7/2008
JP        2004-036948 A  2/2004
(Continued)

OTHER PUBLICATIONS

International Search Report corresponding to PCT/KR2022/013155 mailed Dec. 5, 2022.
(Continued)

*Primary Examiner* — An T Nguyen
(74) *Attorney, Agent, or Firm* — Sandberg Phoenix & von Gontard, PC

(57) ABSTRACT

A management system according to the present invention may comprise: a body including an opening/closing door; a first terminal that is located inside the body, measures environment information inside the body, and generates first data on the basis of the measured environment information; a second terminal that is located outside the body, generates second data including state information of the opening/closing door, and generates third data on the basis of the first data and the second data; and a server that generates a signal including risk coefficient information indicating a contamination level inside the body on the basis of the third data, and transmits the signal to a user terminal.

10 Claims, 7 Drawing Sheets

(56) References Cited

U.S. PATENT DOCUMENTS

2014/0119162 A1* 5/2014 Yeary ............... G10K 11/24
                                                                      367/178
2018/0226187 A1   8/2018 Bien et al.
2019/0214734 A1*  7/2019 Bien ............... H02J 50/20
2020/0144983 A1*  5/2020 Xiang ............... H03H 9/145

FOREIGN PATENT DOCUMENTS

| JP | 2016-115342 A | 6/2016 |
| KR | 10-2005-0046841 A | 5/2005 |
| KR | 10-1257406 B1 | 4/2013 |
| KR | 10-2017-0014857 A | 2/2017 |
| KR | 10-1952908 B1 | 3/2019 |

OTHER PUBLICATIONS

Written Opinion corresponding to PCT/KR2022/013155 mailed Dec. 5, 2022.
Extended European Search Report for corresponding EP App No. 22865078.4 mailed Sep. 1, 2025.

* cited by examiner

METHOD AND SYSTEM FOR MANAGING METAL SHIELD SPACE USING PLURALITY OF TERMINALS

CROSS-REFERENCE TO RELATED APPLICATIONS

This application is the US National Stage under 35 USC § 371 of International App. No. PCT/KR2022/013155, filed 2 Sep. 2022, which claims priority to Korean App. No. 10-2021-0117520, filed 3 Sep. 2021, both of which are incorporated herein by reference.

TECHNICAL FIELD

The present disclosure relates to a method and system for managing a metal shielded space, and more particularly, a method and system for managing a product loaded in a shielded space through terminals disposed inside and outside of a space shielded by metal.

BACKGROUND

A representative example of transporting and storing a product through a space shielded by metal may be a container. A container may refer to a rectangular-box type container formed of a metal material used for efficiently and economically transporting cargo. Currently, various loading containers have been used to rapidly transport large quantities of cargo in various industrial fields. The container may allow various types of cargo to be conveniently transported.

On the other hand, when the container is used for the overseas export or import of products that require a continuously maintained specific environment, and such products are loaded in the container, an internal situation of the container may need to be continuously managed. The following is a problem of a conventional management system.

Firstly, the conventional management system may not comprehensively consider an internal factor and an external factor. A product loaded in a container may be affected by not only an environmental factor in the container but also an external factor (e.g., an inflow of outside air, etc.) of the container. For example, when adjusting an internal environment of the container using a method of maintaining an internal temperature at a low temperature using a refrigerant, a problem due to deterioration of the refrigerant (an internal factor) as well as a problem (an external factor) that an appropriate temperature may not be maintained as cold air leaks to the outside due to a gap (e.g., opening a door) between a body and an opening and closing door of the container may occur.

Secondly, the conventional management system may not consider and manage a priority of containers. When multiple containers are used to move objects, there may be a container that needs to be managed first. However, if the priority is not considered, a management problem may occur.

Thirdly, the container may have a shielded environment by metal, and when a communication antenna is placed on or is in contact with a metal surface, a communication feature may be degraded, thereby, communication between the outside and inside may not be smoothly performed.

SUMMARY

Technical Goals

To solve the problem described above, a goal of the present disclosure is to provide a management method and system for efficiently managing products loaded inside a space shielded by metal through terminals disposed inside and outside of the space.

Technical Solutions

A management system according to the present disclosure to achieve the goal described above, the management system includes a body including an opening and closing door and provided with a space shielded by metal, a first terminal disposed inside the body and configured to measure environmental information of an inside of the body and generate first data based on the measured environmental information, a second terminal disposed outside of the body and configured to generate second data including state information of the opening and closing door and generate third data based on the first data and the second data, and a server configured to generate a signal including a risk index indicating a contamination level of the inside of the body based on the third data and transmit the signal to a user terminal, wherein the first terminal includes a first metal communication device that is in contact with a surface of the inside of the body, and the first terminal transmits the first data to the second terminal through a surface wave generated by the first metal communication device.

The environmental information of the inside of the body includes at least one piece of information of a temperature, humidity, pressure, an amount of light, a concentration of harmful gas, and a concentration of carbon dioxide.

The first data is calculated by Equation 1 as follows:

$$CIF_{1_i}(x) = ((|T_i(x) - T_{i-1}(x)| \times WT_i) + \qquad \text{(Equation 1)}$$
$$(|H_i(x) - H_{i-1}(x)| \times WH_i) + (|C_{i(x)} - C_{i-1}(x)| \times WC_i))$$

The state information of the opening and closing door includes a number of the opening and closing doors, a type of the opening and closing door, a number of open doors among the opening and closing doors, opening and closing information of the opening and closing door, and an opening and closing rate of the opening and closing door, the number of the opening and closing doors is a natural number, the type of the opening and closing door has a value that is greater than or equal to 0, the number of the open doors is a natural number that is less than or equal to the number of opening and closing doors, the opening and closing information of the opening and closing door has a value of 0 or 1, and the opening and closing rate of the opening and closing door has a value between 0 and 270.

The second data is calculated by Equation 2 as follows:

$$CIF_{2_i}(x) = \left(D_T(x) \times \frac{|R_i(x) - R_{i-1}(x)|}{\ln W_i} \times L_i(x)\right) \times D_R(x)^{nk} \qquad \text{(Equation 2)}$$

The third data is calculated by Equation 3 as follows:

$$CIF_{3_i}(x) = \sqrt{\left((CIF_{1_i} - CIF_{1_{i-1}})^2 + (CIF_{2_i} - CIF_{2_{i-1}})^2\right)} \qquad \text{(Equation 3)}$$

The signal, which further includes an instruction to control the opening and closing door and urgency level information assessed based on the risk index, is transmitted to the second terminal, and the second terminal controls the opening and closing door based on the instruction and the urgency level information.

The first metal communication device includes a surface part contacting a surface inside the body and performing communication, an antenna controlling resonance of a surface wave used for the communication, and an excitation unit exciting the antenna based on a surface wave transmitted from the antenna.

The antenna includes a first layer, a second layer connected to the first layer, and a third layer connected to the second layer, the first layer includes a conductor having an area of 10 to 1000 mm$^2$, the second layer includes a conductor formed in a spiral structure wound 1 to 15 times at an interval of 1 to 15 mm, and the third layer includes a conductor having an area of 9 to 2500 cm$^2$.

The second terminal includes a second metal communication device contacting an outer surface of the opening and closing door and configured to perform communication, and the second terminal performs communication with the first terminal via the second metal communication device.

Effects

According to the present disclosure, a management method and system for comprehensively considering internal and external environments may be provided. In addition, a management method and system for prioritizing products that need to be urgently managed may also be provided. In addition, a container management method and system for providing smooth communication in a space shielded by metal may be provided.

However, the effects to be achieved by a method and system for managing a metal shielded space using multiple terminals according to embodiments of the present disclosure are not limited to those described above, and other effects not mentioned above will be clearly understood by one of ordinary skill in the art from the following description.

DETAILED DESCRIPTION

Figure 1:
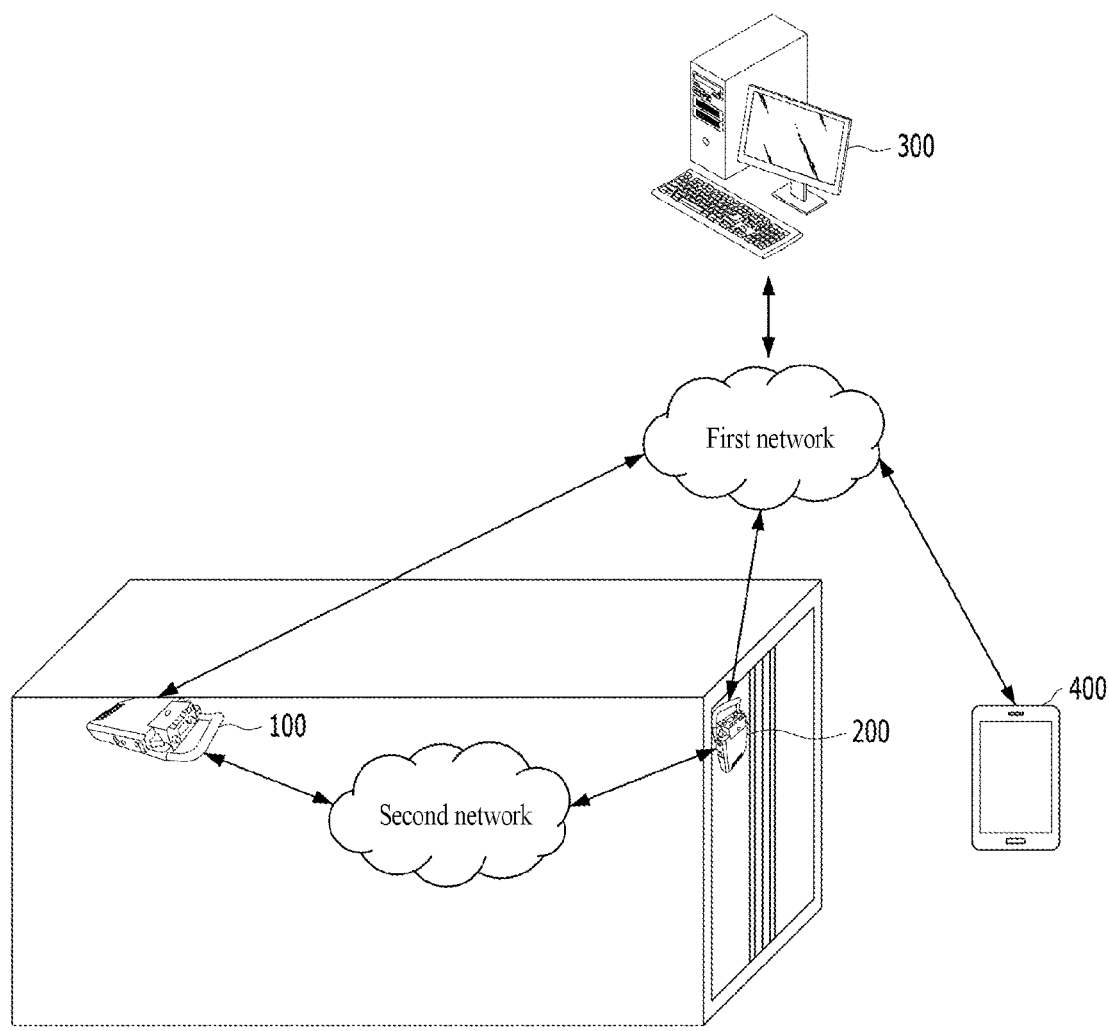
FIG. 1 is a diagram illustrating a configuration of a management system according to one embodiment of the present disclosure.

Hereinafter, preferred embodiments of the present disclosure will be described in detail with reference to the accompanying drawings. For easy understanding of the present disclosure, the same reference numerals are used for the same components in the drawings and a repeated description related to the same components will be omitted.

In the entire specification, a terminal may refer to a mobile station, a mobile terminal, a subscriber station, a portable subscriber station, user equipment, an access terminal, and the like, and may include all or some functions of the terminal, the mobile station, the mobile terminal, the subscriber station, the portable subscriber station, the user equipment, the access terminal, and the like.

In this case, a desktop computer, a laptop computer, a tablet personal computer (PC), a wireless phone, a mobile phone, a smartphone, a smartwatch, smart glasses, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, and the like, may be used.

FIG. 1 is a diagram illustrating a configuration of a management system according to one embodiment of the present disclosure.

Referring to FIG. 1, a management system according to the present disclosure may include a first terminal 100, a second terminal 200, a server 300, and a user terminal 400. The first terminal 100 may be disposed inside a body provided with a space shielded by metal, may measure an internal environment, and may generate data based on measured information. The first terminal 100 may be in contact with one surface inside the body.

The second terminal 200 may be disposed outside the body provided with the space shielded by metal, may measure information related to an opening and closing door, and may generate data based on measured information. The second terminal 200 may be in contact with an exterior of the body, more specifically, one outer surface of the opening and closing door. The second terminal 200 may have a function for automatically controlling the opening and closing of the opening and closing door. Meanwhile, in one embodiment, the body provided with the space shielded by metal may be a container body. However, the body is not limited to the container body and may refer to a shape provided with a space shielded by metal.

The server 300 may receive data from the first terminal 100, the second terminal 200, and the user terminal 400 and may generate data displaying a state of the body by joining, analyzing, and combining the received data. The user terminal 400 may receive data displaying a state of a container from the server 300 and may allow a user to identify a state of the body.

The first terminal 100, the second terminal 200, the server 300, and the user terminal 400 may transmit and receive data via a first network. In one embodiment, the first network may be a wireless Internet 3.5G mobile communication network, such as wireless fidelity (Wi-Fi), a long-term evolution (LTE) network or a 4G mobile communication network such as an LTE-advanced network, and a 5G mobile communication network. Meanwhile, the first terminal 100 and the second terminal 200 may transmit and receive data through a second network. The second network may be a network structure for efficiently performing data communication in an environment shielded by metal.

MODE FOR CARRYING OUT THE INVENTION

Figure 2:
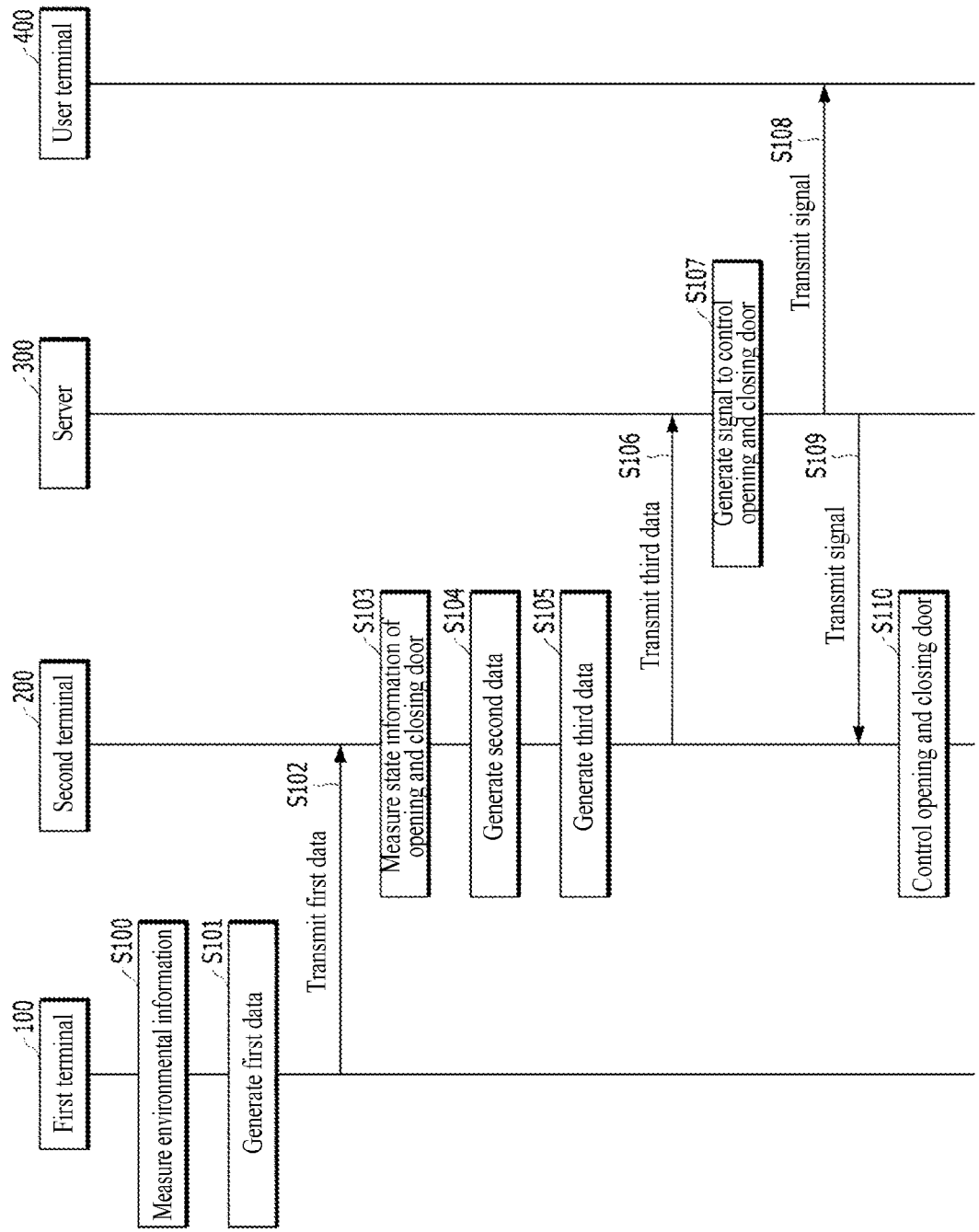
FIG. 2 is a flowchart illustrating an operating system of a management system according to one embodiment of the present disclosure.

FIG. 2 is a flowchart illustrating an operating system of a management system according to one embodiment of the present disclosure.

Referring to FIG. 2, in S100, the first terminal 100 may measure environmental information inside a body. The environmental information may include a temperature, humidity, pressure, a concentration of carbon dioxide, an amount of light, and a concentration of harmful gas.

Figure 3:
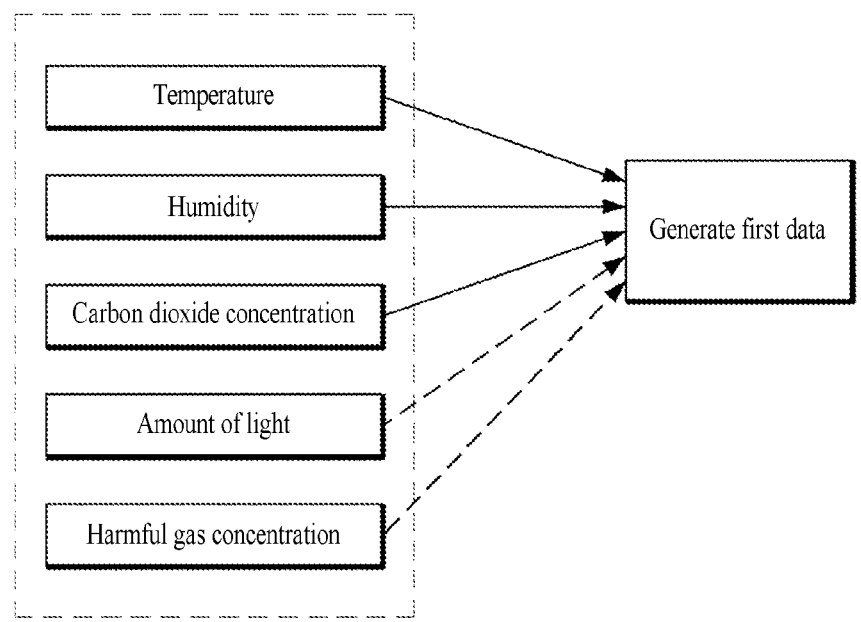
FIG. 3 is a conceptual diagram specifically illustrating S101 of FIG. 2.

In S101, the first terminal 100 may generate first data based on the measured environmental information. FIG. 3 is a conceptual diagram specifically illustrating S101 of FIG. 2. Referring to FIG. 3, the first terminal 100 may generate first data by considering at least one parameter of the measured environmental information. In this case, the first terminal 100 may generate the first data by considering a weight.

In one embodiment, the first terminal 100 may generate the first data as Equation 1 shown below by considering three parameters, which are the temperature, humidity, and a carbon dioxide concentration.

$$CIF_{1_i}(x) = ((|T_i(x) - T_{i-1}(x)| \times WT_i) + \quad\quad\quad \text{[Equation 1]}$$
$$(|H_i(x) - H_{i-1}(x)| \times WH_i) + (|C_{i(x)} - C_{i-1}(x)| \times WC_i))$$

In this case, $CIF_{1_i}(x)$ may be first data of a body x at a time point of i, $T_i(x)$ may be a temperature inside the body x at the time point of i, $H_i(x)$ may be humidity inside the body x at the time point of i, and $C_i(x)$ may be a concentration of carbon dioxide inside the body x at the time point of i. $WT_i$ may be a temperature weight at the time point of i, $WH_i$ may be a humidity weight at the time point of i, $WC_i$ may be a carbon dioxide concentration weight at the time point of i, and $WT_i + WH_i + WC_i = 1$. The first terminal 100 may appropriately change and set weights by considering the time, season, place (area), and weather at the time of measurement. As the $CIF_{1_i}(x)$ value increases, a state of the body may be deteriorated.

Referring to FIG. 2, in operation S102, the first terminal 100 may transmit the first data to the second terminal 200. In other words, the second terminal 200 may receive the first data from the first terminal 100. The first terminal 100 and the second terminal 200 may perform mutual communication in an environment shielded by metal. The first terminal 100 may include a first metal communication device and the second terminal 200 may include a second metal communication device. The first terminal 100 and the second terminal 200 may communicate via the metal communication device to perform smooth communication in the environment shielded by metal.

Figure 4:
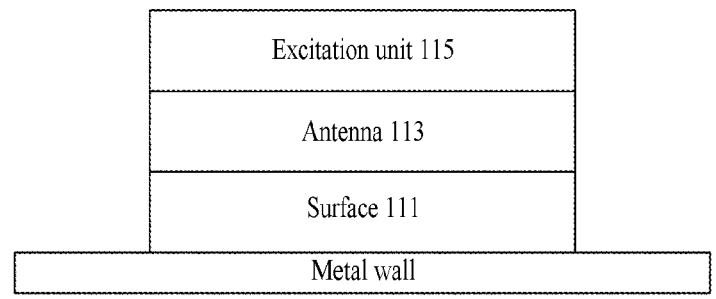
FIG. 4 is a conceptual diagram illustrating a metal communication device according to one embodiment of the present disclosure.

FIG. 4 is a conceptual diagram illustrating a first metal communication device according to one embodiment of the present disclosure.

Referring to FIG. 4, a first metal communication device 110 may include a surface portion 111, an antenna 113, and an excitation unit 115 and may perform data communication using a surface wave propagated by a metal wall. The surface portion 111 may contact the metal wall constituting an interior of a body. The surface portion 111 may cause the first metal communication device 110 to be attached to a conductor. In one embodiment, the surface portion 111 may include a magnet and may cause the first metal communication device 110 to attach to a surface of the conductor through the magnet. The surface portion 111 may be in contact with the metal wall in the body and may perform communication. Meanwhile, when attaching the surface portion 111, a predetermined gap may be formed between the antenna 113 and the conductor. In one embodiment, the first metal communication device 110 may be attached to the conductor by placing a gap between the antenna 113 and the conductor such that the antenna 113 and the conductor (or the surface of the conductor) are combined with an appropriate capacitance component. Accordingly, resonance may be formed between the antenna 113 and the conductor. Accordingly, the conductor forming resonance with the antenna 113 may operate as a portion of the antenna.

Figure 5:
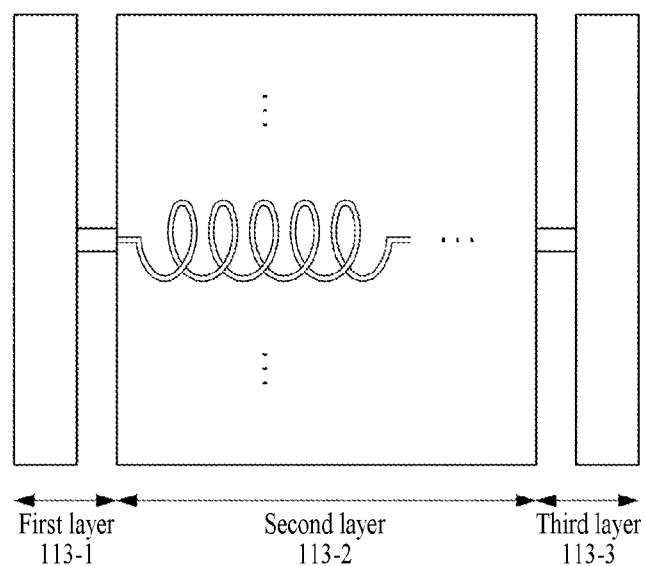
FIG. 5 is a conceptual diagram illustrating an antenna according to one embodiment of the present disclosure.

The antenna 113 may be disposed on a top portion of the surface portion 111. The antenna 113 may control resonance of a surface wave used for data communication. The antenna 113 may have an impedance component. The impedance component may include, for example, a small amount of a resistance component and an inductance component, and/or a capacitance component. FIG. 5 is a conceptual diagram illustrating an antenna according to one embodiment of the present disclosure. Referring to FIG. 5, the antenna 113 may include a first layer 113-1, a second layer 113-2, and a third layer 113-3. The second layer 113-2 may be connected to the first layer 113-1, and the third layer 113-3 may be connected to the second layer 113-2.

The first layer 113-1 may be a conductor that is a metallic material and may include a first connecting part extending in a longitudinal direction in a predetermined unit to be connected to the second layer 113-2.

The second layer 113-2 may be a conductor that is a metallic material and may be connected to the first layer 113-1 through the first connecting part. The second layer 113-2 may include a structure in which a metal wire (e.g., a copper wire) is wound in a spiral shape at a predetermined interval.

The third layer 113-3 may be a conductor that is a metallic material and may include a second connecting part extending in a longitudinal direction in a predetermined unit to be connected to the second layer 113-2. The third layer 113-3 may be connected to the second layer 113-2 through the second connecting part.

In one embodiment, the first layer 113-1 may be a conductor having an area of 10 to 1000 $mm^2$, the second layer 113-2 may be a conductor having a spiral structure in wound 1 to 15 times at an interval of 1 to 15 mm, and the third layer 113-3 may be a conductor having an area of 9 to 2500 $cm^2$. When having a numerical range as described above, higher communication performance may be secured in a shadow zone.

When the area of the first layer 113-1 is less than 10 $mm^2$, a contacting surface with the surface portion 111 may be significantly small and the surface wave may not be easily transmitted, thereby, an accuracy ratio of the communication may decrease. Conversely, when the area of the first layer 113-1 exceeds 1000 $mm^2$, the contacting surface may be significantly great, thereby, the communication speed may decrease. Therefore, a preferable area of the first layer 113-1 may be 10 to 1000 $mm^2$.

When the interval of the spiral structure included in the second layer 113-2 is less than 1 mm, interference between conductors may occur. Conversely, when the interval of the spiral structure exceeds 15 mm, the communication efficiency may decrease. Therefore, a preferable spiral structure included in the second layer 113-2 may be a structure wound 1 to 15 times at an interval of 1 to 15 mm.

When the area of the third layer 113-3 is less than 9 cm$^2$, a value of surface impedance may decrease and the communication performance may be degraded. When the area of the third layer 113-1 is more than 2500 cm$^2$, the value of surface impedance may decrease and the communication performance may be degraded. Therefore, a preferable area of the third layer 113-3 may be 9 to 2500 cm$^2$.

Figure 6:
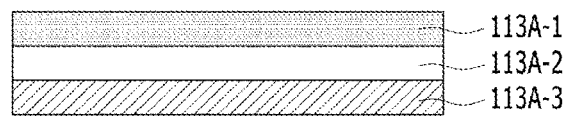
FIG. 6 is a conceptual diagram illustrating an antenna according to another embodiment of the present disclosure.

FIG. 6 is a conceptual diagram illustrating an antenna according to another embodiment of the present disclosure.

Referring to FIG. 6, in an antenna 113A, at least two adjacent slits may be respectively formed on openings of different surfaces in a plate shape and the antenna 113A may include a pattern layer 113A-1 having a connecting part, a ground layer 113A-3 connected to the pattern layer 113A-1 through the connecting part and disposed in parallel with the pattern layer, and a dielectric layer 113A-2 disposed between the pattern layer 113A-1 and the ground layer 113A-3.

In this case, a connecting surface of the pattern layer 113A-1 may have a length that is at least one of a half wavelength or a quarter wavelength of a wavelength corresponding to a carrier frequency of wireless communication selected in a very high frequency (VHF) band.

Figure 7:
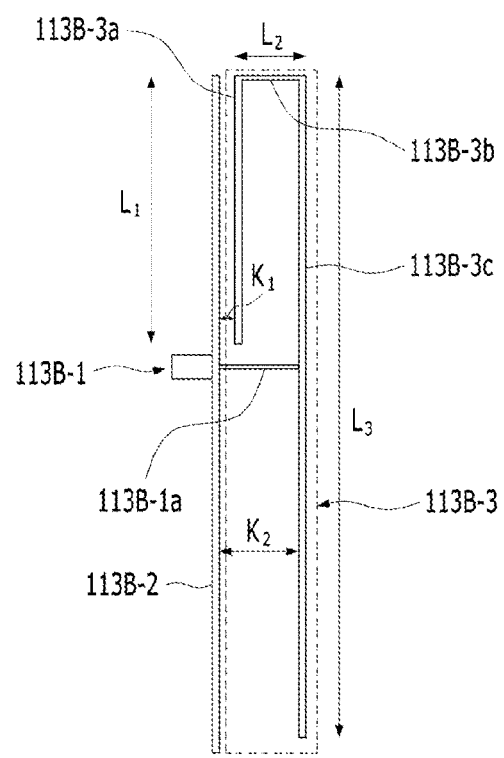
FIG. 7 is a conceptual diagram illustrating an antenna according to another embodiment of the present disclosure.

FIG. 7 is a conceptual diagram illustrating an antenna according to another embodiment of the present disclosure.

Referring to FIG. 7, an antenna 113B may include a coaxial line 113B-1, a ground surface 113B-2, and a radial surface 113B-3. The coaxial line 113B-1 may include an outer line (not shown) and an inner line 113B-1a for supplying power to the antenna 113B. The ground surface 113B-2 may be attached to a support body and a hole through which an inner line of the coaxial line 113B-1 penetrates may be formed at a first point of the ground surface 113B-2. The inner line 113B-1a of the coaxial line 113B-1 may be inserted through the hole of the ground surface and may be in contact with a second point of the radial surface 113B-3 corresponding to the first point of the ground surface 113B-2, and the outer line of the coaxial line 113B-1 may be in contact with the ground surface 113B-2.

The radial surface 113B-3 may have a curved structure including a first radial section 113B-3a, a second radial section 113B-3b, and a third radial section 113B-3c. In this case, the first radial section 113B-3a may be arranged over a length L$_1$ from a top of the ground surface to a first vertical position, wherein the length L$_i$ may be shorter than a length from the top of the ground surface 113B-2 to the inner line 113B-1a of the coaxial line while being spaced apart from the ground surface 113B-2 by a first horizontal distance K$_1$. The third radial section 113B-3c may be arranged over a length L$_3$ from the top of the ground surface 113B-2 to a second vertical position, wherein the length L$_3$ may be shorter than the top of the ground surface 113B-2 to a support body (not shown) while being spaced apart from the ground surface 113B-2 by a second horizontal distance K$_2$. The second radial section 113B-3b may connect the first radial section 113B-3a to the third radial section 113B-3c to consecutively arrange the first radial section 113B-3a, the second radial section 113B-3b, and the third radial section 113B-3c. In this case, the second horizontal distance K$_2$ may be greater than the first horizontal distance K$_1$. In this case, the radial surface 113B-3 may be prevented from contacting the ground surface 113B-2 and the support body (not shown) using a dielectric. As described above, a compact antenna may be designed by decreasing a total height of the antenna by applying the curved structure to the radial surface.

Referring to FIG. 4, the first metal communication device 110 may include the excitation unit 115 and the excitation unit 115 may excite the antenna 113 based on a surface wave transmitted from the antenna 113. Meanwhile, the first metal communication device 110 may further include a layer (not shown) including a ground plate stacked on the top of the excitation unit 115. A second metal communication device (not shown) included in the second terminal 200 may have the same configuration as the first metal communication device 110 described above.

The first terminal 100 may transmit the first data to the second terminal 200 through the first metal communication device 110 described with reference to FIGS. 4 and 5, and the second terminal 200 may receive the first data through the second metal communication device.

Figure 8:
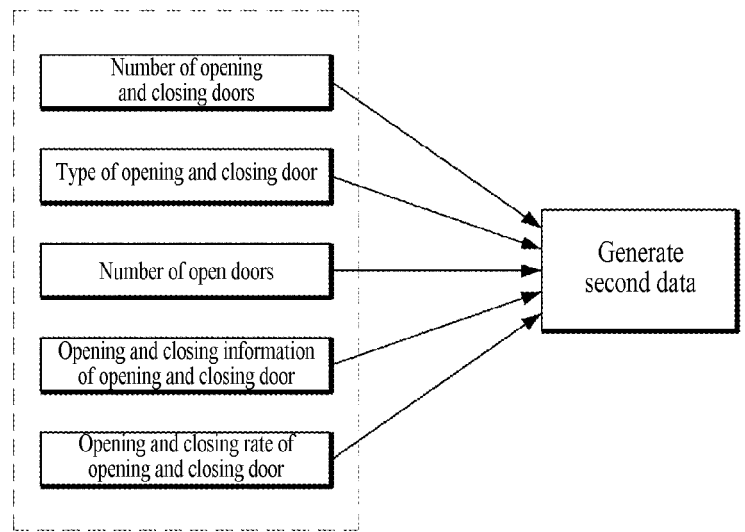
FIG. 8 is a conceptual diagram specifically illustrating S103 and S104 of FIG. 2.

Referring to FIG. 2, in operation S103, the second terminal 200 may measure state information of the opening and closing door and in operation S104, the second terminal 200 may generate second data based on the measured state information of the opening and closing door. FIG. 8 is a conceptual diagram specifically illustrating S103 and S104 of FIG. 2.

Referring to FIG. 8, the second terminal 200 may generate the second data based on the number of opening and closing doors, a type of the opening and closing door, the number of open doors, information on the opening and closing of the opening and closing door, and an opening and closing rate of the opening and closing door.

The number of opening and closing doors may be a value of a natural number greater than or equal to "1", and the type of the opening and closing door may be a value greater than or equal to "0" and may be set depending on the type of a body. For example, when the body is a container body, the type of the opening and closing door may have a different value depending on a dry container, an open top container, a tank container, a ventilated container, and a reefer container.

The number of open doors may be a value of a natural number that is less than or equal to the number of opening and closing doors, and the information on the opening and closing of the opening and closing door may be 0 (when closed) or 1 (when open). The opening and closing rate of the opening and closing door may have a value between 0 and 270. The opening and closing rate of the opening and closing door may be a value considering an angle considering a rotation range of the door.

In one embodiment, the second terminal 200 may generate the second data as Equation 2 shown below by considering the parameter described above.

$$CIF_{2_i}(x) = \left( D_T(x) \times \frac{|R_i(x) - R_{i-1}(x)|}{\ln W_i} \times L_i(x) \right) \times D_R(x)^{nk} \quad \text{[Equation 2]}$$

In this case, CIF$_{2_i}$(x) may be second data of a body x at a time point of i, R$_i$(x) may be an opening and closing rate of an opening and closing door included in the body x at the time point of i, n may be the number of opening and closing doors included in the body x, k may be the number of open doors, D$_T$(x) may be a type of the opening and closing door included in the body x, L$_i$(x) may be opening and closing information of the opening and closing door included in the body x at the time point of i, D$_R$(x) may be $$\frac{\sum_i^n R_i(x)}{n},$$

and $W_i$ may be a weight based on the time point of i. $W_i$ may change depending on a metal material constituting the body at the time point of i. For example, as the $W_i$ decreases, a metal material may be more vulnerable to an external environment. As the $CIF_{2_i}(x)$ value increases, the state of the body may be deteriorated.

Figure 9:
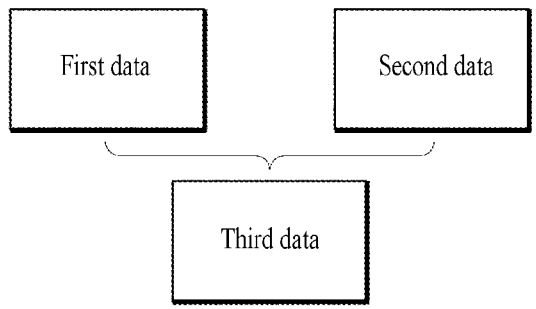
FIG. 9 is a conceptual diagram specifically illustrating S105 of FIG. 2.

Referring to FIG. 2, in operation S105, the second terminal 200 may generate third data based on the first data and the second data received from the first terminal 100. FIG. 9 is a conceptual diagram specifically illustrating S105 of FIG. 2. Referring to FIG. 9, the second terminal 200 may generate third data based on the first data and the second data.

In one embodiment, the second terminal 200 may generate the third data as Equation 3.

$$CIF_{3_i}(x) = \sqrt{\left((CIF_{1_i} - CIF_{1_{i-1}})^2 + (CIF_{2_i} - CIF_{2_{i-1}})^2\right)} \quad \text{[Equation 3]}$$

In this case, $CIF_{1_i}(x)$ may be first data of a body x at a time point of i, $CIF_{2_i}(x)$ may be second data of the body x at the time point of i, and $CIF_{3_i}(x)$ may be third data of the body x at the time point of i. As described above, the third data may be data that comprehensively considers the first data indicating information about an inside of the body and the second data indicating body external information (information about the opening and closing door). As $CIF_{3_i}(x)$ increases, a contamination level of the body may increase. Meanwhile, in another embodiment, a process of generating the third data may be performed as a process of generating the third data as the server 300 receives the first data and the second data from the second terminal 200.

Referring to FIG. 2, in operation S106, the second terminal 200 may transmit the third data to the server 300. Thereafter, in operation S107, the server 300 may generate a signal including a risk index indicating a contamination level of the inside of the body based on the third data received from the second terminal 200. Thereafter, in operations S108 and S109, the server 300 may transmit the generated signal to the user terminal 400 and the second terminal 200.

Figure 10:
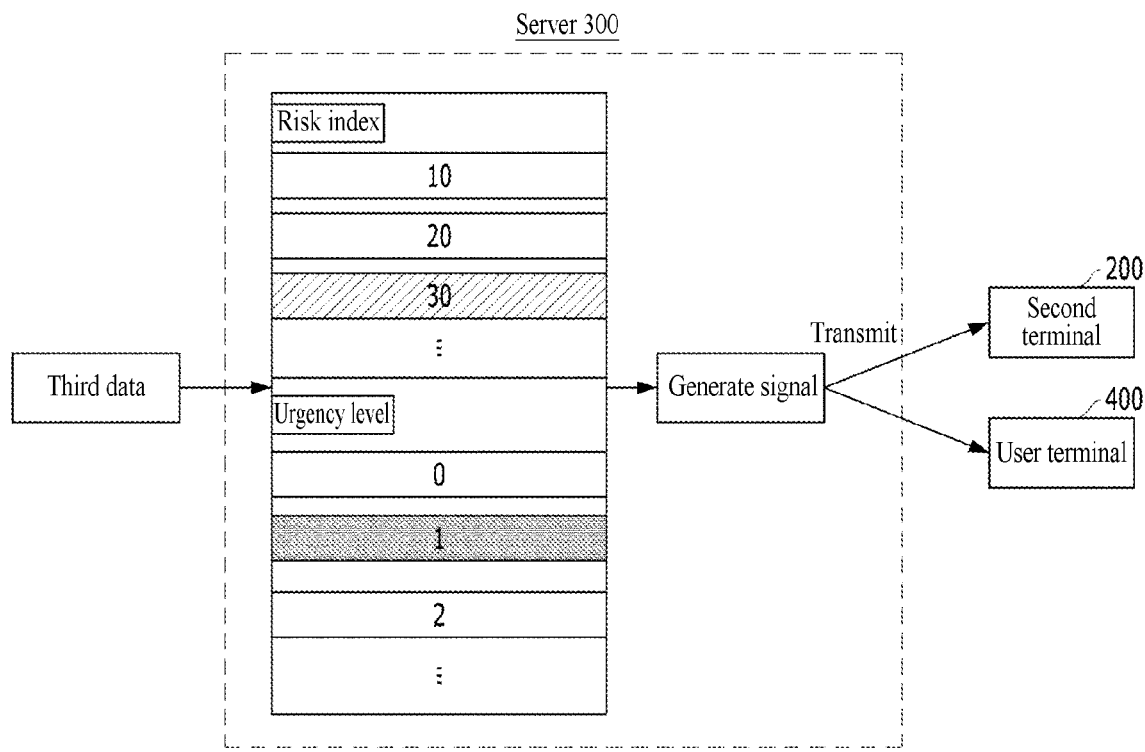
FIG. 10 is a conceptual diagram specifically illustrating S107, S108, and S109 of FIG. 2.

FIG. 10 is a conceptual diagram specifically illustrating S107, S108, and S109 of FIG. 2. Referring to FIG. 10, the server 300 may generate a signal including risk index information and urgency level information assessed based on the risk index information by considering the third data. In addition, the server 300 may generate a signal further including an instruction to control the opening and closing door.

The $CIF_{3_i}(x)$ value included in the third data may be a value indicating a contamination level of the inside of the body. As the risk index increases, for example, the container may need to be urgently managed. The urgency level may be a value corresponding to the risk index and the lower the value, the more urgent handling may be required. In one embodiment, when the risk index is greater than or equal to 50, the urgency level may correspond to 0 and when the risk index is between 30 and 50, the urgency level may correspond to 1.

The user terminal 400 may receive a signal from the server 300 and accordingly, a user may prioritize and handle a body that is urgent to be managed, for example, a container. Meanwhile, the server 300 may transmit a signal additionally including an instruction to control the opening and closing door to the second terminal 200. In this case, the second terminal 200 may automatically control the opening and closing door in response to the instruction included in the signal.

Figure 11:
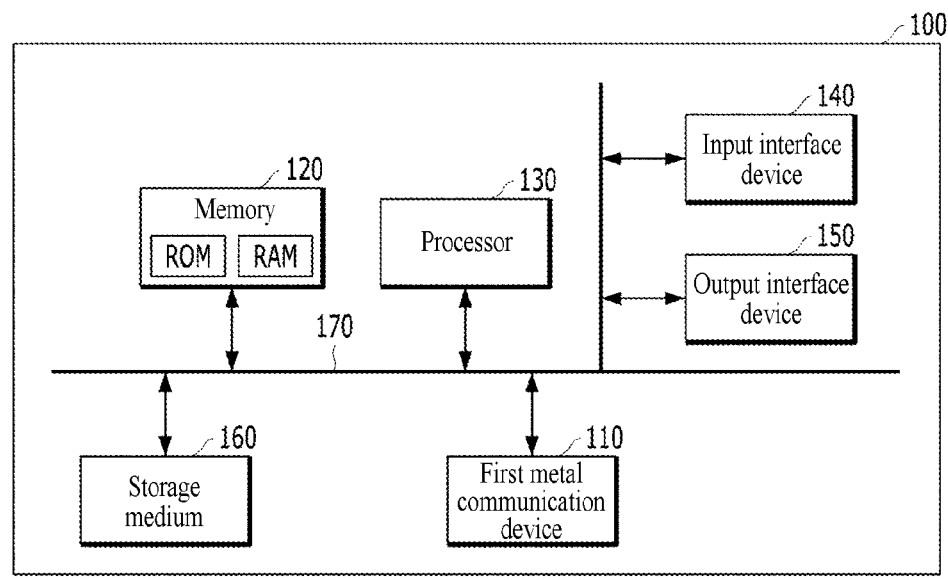
FIG. 11 is a diagram illustrating a hardware configuration of a first terminal according to one embodiment of the present disclosure.

FIG. 11 is a diagram illustrating a hardware configuration of a first terminal according to one embodiment of the present disclosure.

The first terminal 100 may include the first metal communication device 110, a memory 120, and at least one processor 130. In addition, the first terminal 100 may further include an input interface device 140, an output interface device 150, and a storage device 160. Components included in the first terminal 100 may be connected to each other by a bus 170 and may communicate with each other.

However, the components included in the first terminal 100 may be connected via an individual interface or an individual bus based on the processor 130 rather than the universal bus 170. For example, the processor 130 may be connected to at least one of the memory 120, the first metal communication device 110, the input interface device 140, the output interface device 150, and the storage device 160 via a dedicated interface.

The processor 130 may execute a program command stored in at least one of the memory 120 and the storage device 160. The processor 130 may be a central processing unit (CPU), a graphics processing unit (GPU), or a dedicated processor for performing the methods according to embodiments of the present disclosure. The memory 120 and the storage device 160 may each be configured by at least one of a volatile storage medium and a non-volatile storage medium. For example, the memory 120 may be configured by at least one of read-only memory (ROM) and random access memory (RAM). Meanwhile, a hardware configuration of the second terminal 200 may be the same as the hardware configuration of the first terminal 100.

The methods according to the present disclosure may be recorded in non-transitory computer-readable media including program instructions to implement various operations of the above-described examples. The computer-readable media may also include, alone or in combination with the program instructions, data files, data structures, and the like. The program instructions recorded on the computer-readable media may be those specially designed and constructed for the purposes of the present disclosure, or they may be of the kind well-known and available to those having skill in the computer software arts.

Examples of the computer-readable media may include a hardware device specially configured to store and execute program instructions, such as ROM, RAM, and flash memory. Examples of program instructions include both machine code, such as produced by a compiler, and files containing higher-level code that may be executed by the computer using an interpreter. The above-described hardware device may be configured to act as one or more software modules in order to perform the operations of the present disclosure, or vice versa.

Although described above with reference to the embodiments, it could be understood by those skilled in the art that the present disclosure may be modified and changed in various manners within the scope without departing from the technical goals of the present disclosure disclosed in the scope of the claims below.

INDUSTRIAL APPLICABILITY

The present disclosure may be applicable to a product management industry.

The invention claimed is:

1. A management system comprising:
   a body comprising an opening and closing door and provided with a space shielded by metal;
   a first terminal disposed inside the body and configured to measure environmental information of an inside of the body and generate first data based on the measured environmental information;
   a second terminal disposed outside of the body and configured to generate second data comprising state information of the opening and closing door and generate third data based on the first data and the second data; and
   a server configured to generate a signal comprising a risk index indicating a contamination level of the inside of the body based on the third data and transmit the signal to a user terminal,
   wherein the first terminal comprises a first metal communication device that is in contact with a surface of the inside of the body, and the first terminal transmits the first data to the second terminal through a surface wave generated by the first metal communication device.

2. The management system of claim 1, wherein the environmental information of the inside of the body comprises at least one piece of information of a temperature, humidity, pressure, an amount of light, a concentration of harmful gas, and a concentration of carbon dioxide.

3. The management system of claim 2, wherein the first data is calculated by Equation 1 as follows:

$$CIF_{1_i}(x) = ((|T_i(x) - T_{i-1}(x)| \times WT_i) + (|H_i(x) - H_{i-1}(x)| \times WH_i) + (|C_{i(x)} - C_{i-1}(x)| \times WC_i)) \quad \text{(Equation 1)}$$

(where $CIF_{1_i}(x)$ is first data of a body x at a time point of i, $T_i(x)$ is a temperature of an inside of the body x at the time point of i, $H_i(x)$, is humidity of the inside of the body x at the time point of i, $C_i(x)$ is a concentration of carbon dioxide inside the body x at the time point of i, $WT_i$ is a temperature weight at the time point of i, $WH_i$ is a humidity weight at the time point of i, an $WC_i$ is a carbon dioxide concentration weight at the time point of i, and $WT_i + WH_i + WC_i = 1$).

4. The management system of claim 3, wherein the state information of the opening and closing door comprises a number of the opening and closing doors, a type of the opening and closing door, a number of open doors among the opening and closing doors, opening and closing information of the opening and closing door, and an opening and closing rate of the opening and closing door, the number of the opening and closing doors is a natural number,
   the type of the opening and closing door has a value that is greater than or equal to 0,
   the number of the open doors is a natural number that is less than or equal to the number of opening and closing doors,
   the opening and closing information of the opening and closing door has a value of 0 or 1, and
   the opening and closing rate of the opening and closing door has a value between 0 and 270.

5. The management system of claim 4, wherein the second data is calculated by Equation 2 as follows:

$$CIF_{2_i}(x) = \left(D_T(x) \times \frac{|R_i(x) - R_{i-1}(x)|}{\ln W_i} \times L_i(x)\right) \times D_R(x)^{nk} \quad \text{(Equation 2)}$$

(where $CIF_{2_i}(x)$ is second data of a body x at a time point of i, $R_i(x)$ is an opening and closing rate of an opening and closing door comprised in the body x at the time point of i, n is the number of opening and closing doors comprised in the body x, k is the number of open doors, $D_T(x)$ is a type of the opening and closing door comprised in the body x, $L_i(x)$ is opening and closing information of the opening and closing door comprised in the body x at the time point of i, $D_R(x)$ is $$\frac{\sum_i^n R_i(x)}{n},$$

and $W_i$ is a weight based on the time point of $i_{-1}$).

6. The management system of claim 5, wherein the third data is calculated by Equation 3 as follows:

$$CIF_{3_i}(x) = \sqrt{\left((CIF_{1_i} - CIF_{1_{i-1}})^2 + (CIF_{2_i} - CIF_{2_{i-1}})^2\right)} \quad \text{(Equation 3)}$$

(where, $CIF_{1_i}(x)$ is first data of a body x at a time point of i, $CIF_{2_i}(x)$ is second data of the body x at the time point of i, and $CIF_{3_i}(x)$ is third data of the body x at the time point of i).

7. The management system of claim 1, wherein the signal further comprising an instruction to control the opening and closing door and urgency level information assessed based on the risk index is transmitted to the second terminal, and the second terminal controls the opening and closing door based on the instruction and the urgency level information.

8. The management system of claim 1, wherein the first metal communication device comprises:
   a surface part contacting a surface inside the body and performing communication;
   an antenna controlling resonance of a surface wave used for the communication; and
   an excitation unit exciting the antenna based on a surface wave transmitted from the antenna.

9. The management system of claim 8, wherein the antenna comprises
   a first layer, a second layer connected to the first layer, and a third layer connected to the second layer,
   the first layer comprises a conductor having an area of 10 to 1000 $mm^2$,
   the second layer comprises a conductor formed in a spiral structure wound 1 to 15 times at an interval of 1 to 15 mm, and
   the third layer comprises a conductor having an area of 9 to 2500 $cm^2$.

10. The management system of claim 1, wherein the second terminal comprises a second metal communication device contacting an outer surface of the opening and closing door and configured to perform communication, and the second terminal performs communication with the first terminal via the second metal communication device.

* * * * *